2,914,576
Patented Nov. 24, 1959

2,914,576

PRODUCTION OF PERCHLOROETHYLENE AND CATALYST THEREFOR

Raymond M. Vancamp and Albert P. Muren, Jr., New Martinsville, W. Va., assignors to Columbia-Southern Chemical Corporation, Allegheny County, Pa., a corporation of Delaware No Drawing. Application September 4, 1958
Serial No. 758,885

5 Claims. (Cl. 260—654)

The present invention relates to the catalytic production of perchloroethylene. More particularly, the present invention relates to a process involving the catalytic reaction of symmetrical tetrachloroethane and oxygen to produce perchloroethylene and to an improved catalyst for use therein.

The reaction of symmetrical tetrachloroethane and oxygen in the presence of a catalyst to produce perchloroethylene is known in the art and may be conveniently illustrated by the following formula:

$$C_2H_2Cl_4 + \tfrac{1}{2} O_2 \rightarrow H_2O + C_2Cl_4$$

During this reaction, apparently as a result of the cracking of symmetrical tetrachloroethane feed, considerable quantities of trichloroethylene are also produced. Both perchloroethylene and trichloroethylene are valuable solvents, finding widespread use in dry cleaning plants vapor phase degreasing operations and other similar operations. The oxidation process hereinabove described is therefore a convenient method of providing for the production of these two desirable materials.

In the production of these unsaturated chlorinated compounds by this method, however, certain difficulties present themselves which render the process unattractive. Thus, conventional catalysts utilized in this process produce yields of product which are well below theoretical. In addition, catalysts normally employed decrease in activity quite rapidly resulting in decreased yields of product. Further, with known catalysts and conditions of operation, rapid build up in product streams of higher chlorinated hydrocarbons such as pentachloroethane occurs. Compounds of this latter type are produced at the expense of perchloroethylene and trichloroethylene, thereby reducing yields of the desired products while complicating separation and recovery systems by introducing large quantities of undesirables therein.

In accordance with the teachings of this invention, many of the difficulties normally encountered in the production of perchloroethylene by the catalytic reaction of oxygen and symmetrical tetrachloroethane may now be minimized or completely obviated. Thus, catalyst life is materially increased. Further, catalyst activity is maintained for prolonged periods of time with satisfactory yields of product, thereby contributing to the overall economics of the process. In addition, the production of higher chlorinated hydrocarbons such as pentachloroethane is minimized over prolonged periods of operation and in most cases completely obviated during shorter periods of operation.

According to the present invention symmetrical tetrachloroethane and oxygen are reacted in the presence of a copper chloride-zinc chloride-calcium chloride catalyst at temperatures sufficient to promote the reaction between symmetrical tetrachloroethane and oxygen to thereby produce perchloroethylene. Employment in this process of a catalyst comprised of the chlorides of copper, zinc and calcium produces exceptionally high yields of perchloroethylene as well as trichloroethylene while minimizing the production of undesirable chlorinated compounds such as hexachloroethane and pentachloroethane. Catalyst activity is maintained for substantial periods of time and the productivity of the catalyst, that is, the pounds of product per pound of catalyst produced is maintained at a high level for a substantial period of time.

The catalytic material utilized in accordance with this invention is in the form of a particulate composition composed of a carrier material containing thereon the chlorides of zinc, copper and calcium. Many carriers may be employed in accordance with the teachings of this invention. Thus, materials such as alumina, alumina gels, silica, silica gels, calcium silicate, diatomaceous earth, infusorial earth, pumice and kieselguhr, and other like materials may be employed conveniently. A particularly effective carrier is a calcined diatomaceous earth sold by the Johns-Manville Corporation under the trade name Celite.

The form of the carrier particles employed is susceptible of wide variation and may be spherical, cylindrical or irregular in shape. Celite pellets employed in the preferred embodiments of this invention are generally cylindrical in shape, the particles being extruded in manufacture to conform to a uniform diameter and cut in various lengths as desired.

The catalytic chloride salts supported or otherwise contained in the carrier particles may be placed therein utilizing any well known method. Thus, carrier particles immersed in a solution containing the catalytic chloride salts may be one method of placing the catalyst material on the carrier. If desired, solutions containing the active chlorides may be sprayed on catalyst particles and then dried. In fact, any method which will effectively deposit upon the carrier utilized the required quantities of metal chloride salts may be employed.

The catalyst composition utilized herein is prepared by impregnating or coating or otherwise placing on the carrier particle the metal chlorides in amounts ranging from at least 5 percent up to 45 percent by weight of the catalyst particle. The ratio of the various constituents of the chloride mixture employed as catalyst is maintained within certain limits. Thus, the amount of copper chloride used in the catalyst composition of this invention is such that the ratio of the copper chloride to the zinc chloride is maintained between 1 to 3.5 moles of copper chloride per mole of zinc chloride employed. Similarly, the ratio of calcium chloride to the zinc chloride employed is maintained at a ratio of between 0.5 mole to 2.5 moles of calcium chloride per mole of zinc chloride employed. It is found that the chloride catalyst, utilized on a carrier particle in weight percentages of the above range and whose constituents are maintained within the above set forth ratios is an extremely active catalyst for the production of perchloroethylene and trichloroethylene in reactions involving symmetrical tetrachloroethane and oxygen at elevated temperatures.

The reaction of symmetrical tetrachloroethane and oxygen in the presence of a catalyst to produce perchloroethylene is normally conducted in tubular reactors having located therein a catalyst bed. The reactors utilized may be stainless steel, nickel, or other structural material coated or uncoated of varying lengths and diameter. Typically, diameters of tubular reactors employed in this process may range from ½ inch to 6 inches. Similarly, reactor lengths are considerably variable and may range, for example, from 2 feet to as long as 30 feet.

The reactant gases, that is, the tetrachloroethane and oxygen feeds, are passed through the reactors from one end to the other and over the catalyst beds contained therein at rates such that considerable variation may obtain in the contact time. Contact times of 30 seconds may be employed though generally feed rates are regulated so that the contact times of between 5 and 20 seconds are maintained.

In addition considerable variation in temperatures utilized in accordance with the practice of this invention may be employed. Thus, temperatures ranging between 570° F. to 930° F., preferably between 680° F. and 850° F., are employed within the reactors for effective utilization of the catalyst. Hotspots are found in operations of this type in the catalyst bed and under normal conditions it is hotspot temperature which is maintained within the temperature range above defined.

Reactors employed in accordance with this invention are jacketed and a material may be circulated through the reactor jacket at temperatures occurring in the hotspot zone of the catalyst bed. Preferably a heat transfer medium such a Dowtherm is placed in the reactor jacket where it is refluxed in a condenser and returned to the reactor jacket to accomplish the maintenance of the desired 30° F. to 70° F. temperature differential between the jacket and the hotspot temperature.

The symmetrical tetrachloroethane and oxygen fed to the reactors may be preheated by passing the gases separately through separate and distinct preheaters to bring them to a temperature close to operating reactor temperatures prior to introducing the feed gases to the reactor itself. If desired, a portion of the reactor tube itself may be utilized as a preheater by having packed therein ceramic rings or spent catalyst, that is, catalyst which is no longer capable of actively promoting the reaction of tetrachloroethane and oxygen or with any other suitable inert material which when heated will provide adequate heat exchange between the gases passing therethrough and the heated particles.

The ratio of oxygen to symmetrical tetrachloroethane fed to a system of the hereinabove described type is considerably variable but generally is in the range of from 0.1 mole to 1.0 mole of oxygen per mole of symmetrical tetrachloroethane fed. Preferably the oxygen to symmetrical tetrachloroethane ratio is between 0.2 and 0.6 mole of oxygen per mole of tetrachloroethane. Recycle gases, which may be product or undesirables or a combination of both, as well as unreacted tetrachloroethane, may be readily employed in the organic feed steam to the reactor, the ratio of oxygen to organic feed being maintained in the same general ranges above set forth. Oxygen requirements in this latter type operation are based upon the terachloroethane composition of the feed gas. Periodic analysis of the recycle streams will furnish information to enable one skilled in the art to determine the amount of oxygen necessary to react with all tetrachloroethane contained in the feed gas. On obtaining this value, the moles of oxygen per mole of organic feed is then regulated to conform to the ratios above described with respect to a pure tetrachloroethane feed stream. Oxygen in a relatively pure state is utilized although diluted oxygen such as air is operative. Somewhat lower conversions and yields have been experienced with the use of air.

Products issuing from the reactor in accordance with this invention are collected, for example, by recourse to dry ice-acetone cold traps, carbon absorption techniques or any other suitable recovery system.

In a typical operation of the process conducted in accordance with this invention a nickel reactor tube is employed and is packed throughout a substantial portion of its length with a catalyst composition comprising copper chloride, zinc chloride and calcium chloride impregnated on a diatomaceous earth pellet such as Celite 410. Celite 410 is a calcined diatomaceous earth (Lompac, California Diatomite) sold by the Johns-Manville Corporation under the name Celite 410.

Symmetrical tetrachloroethane feed is vaporized by passing it through an open nickel tube. Oxygen is passed through an open steel tube. If desired both the oxygen and the tetrachloroethane preheaters may be packed with inert materials such as ceramic Raschig rings, Beryl saddles and the like to improve heat transfer efficiency in these preheaters. The symmetrical tetrachloroethane and the oxygen are then preferably premixed prior to their entry into the reactor tube. The feed rates of the oxygen and the symmetrical tetrachloroethane are adjusted to maintain the reactant gases within the catalytic bed for between 6 to 20 seconds. The gases issuing from the reactor are passed through a purification and separation system in which the perchloroethylene product and trichloroethylene product are removed. The reactor employed is jacketed and provided with a constant circulating heat transfer medium which maintains temperatures in the reactor jacket of between 540° F. and 900° F. The catalytic bed in the reactor experiences temperatures in the range of from 570° F. to 930° F., generally between 680° F. and 850° F.

It is found in the operation of a process as hereinabove described utilizing the catalyst containing copper, zinc and calcium chlorides that good yields of perchloroethylene and trichloroethylene are obtained, with little pentachloroethane formed for extended periods of time.

The following examples are descriptive of the manner in which the teachings of the present invention may be utilized:

EXAMPLE I

A copper chloride-zinc chloride-calcium chloride composition was prepared by dissolving 110.8 grams of cupric chloride $CuCl_2 \cdot 2H_2O$ (0.65 mole, 34.1 grams of zinc chloride $ZnCl_2$ (0.25 mole), and 30.0 grams of calcium chloride $CaCl_2$ (0.27 mole) in 200 milliliters of water. One thousand milliliters of Celite pellets (¼ inch in diameter and approximately ¼ inch in length) were placed in a rototumbler and the metal chloride containing solution was sprayed on Celite pellets while they were in the rototumbler. The catalyst was dried by evaporating most of the water from the mixture while mixing the pellets in the rototumbler and heating the catalyst at the same time.

EXAMPLE II

A jacketed reactor, containing three nickel tubes was employed. The tubes were each 1½ inches in diameter and 10 feet long. The reactor tubes were packed with a one foot section of untreated Celite pellets to serve as a preheating section. Eight feet of the reactor length was packed with the catalyst prepared in accordance with Example I. A ¼ inch thermowell was placed concentrically in one tube to measure bed temperatures. Dowtherm A, a heat transfer medium manufactured by the Dow Chemical Corporation was utilized as the heat transfer medium in the reactor jacket and was refluxed therein during the entire run. Tetrachloroethane and recycled heavies feed were measured by a positive displacement pump and oxygen was measured with a rotometer.

Organic feed was vaporized in a 2-inch diameter nickel pipe 6 feet long. Oxygen was preheated in a 2 foot section of 1 inch diameter pipe. The reactor was arranged in a vertical position and the organic feed and the oxygen were fed to the reactor upwardly through the bottom thereof.

The product gas stream issuing from the top of the reactor was condensed in a glass shower pipe by contact with refluxing organics which are condensed in a Karbate shell and tube exchanger. The gas issuing from the top of the shower pipe was further condensed by two Dry Ice-acetone cold traps in series. The gases leaving the cold traps were scrubbed with water to remove HCl and passed through a wet test meter to determine the volume of non-condensable vent gases. An Orsat analysis of the vent gases was preformed to determine $CO$, $O_2$, and $CO_2$. The water from the vent scrubber was collected and titrated with sodium hydroxide to determine the amount of unreacted HCl. All organic products were analyzed by infrared spectrometer methods. Organic materials from the bottom of the shower pipe were passed through a series of distillation columns where perchloroethylene and trichloroethylene were recovered. Heavies such as pentachloroethane, hexachloroethane, and unreacted tetrachloroethane were recycled to the organic reactor feed line. The following table illustrates conditions and results of this run.

Table I

| Jacket temperature | 720° F.–730° F. |
| Contact time | 14.5–15.5 sec. |
| $O_2$ Fed (total in moles) | 13.99. |
| $C_2H_2Cl_4$ Fed (total in moles) | 52.55. |

PRODUCT DISTRIBUTION AT VARIOUS STAGES OF CATALYST AGING

| Catalyst Age in Hours Used | Mole Percent | | |
| --- | --- | --- | --- |
|  | $C_2HCl_3$ | $C_2HCl_5$ | $C_2Cl_4$ |
| 200 | 20.7 | 1.9 | 42.4 |
| 300 | 13.8 | 1.4 | 67.4 |
| 400 | 14.6 | 6.0 | 57.6 |
| 500 | 23.8 | 8.9 | 48.2 |
| 600 | 23.0 | 11.0 | 46.0 |
| 700 | 27.5 | 9.5 | 42.7 |
| 800 | 22.2 | 11.4 | 49.6 |

Thus, as can be readily seen from the examples, the utilization of the triple chloride catalyst in accordance with this invention produces surprising and good yields of perchloroethylene and trichloroethylene over prolonged periods of time. The catalyst productivity is maintained at a high level for substantial portions of the run and the build-up of higher chlorinated hydrocarbons such as pentachloroethane is maintained at a minimum value over a prolonged period.

While the invention has been described with reference to certain specific embodiments thereof, it is not intended that the invention be so limited thereby except insofar as appears in the accompanying claims.

We claim:

1. A process for the production of perchloroethylene and trichloroethylene comprising reacting symmetrical tetrachloroethane and oxygen in the presence of a catalyst comprising copper chloride, zinc chloride, and calcium chloride supported on an inert carrier, the ratio of copper chloride to zinc chloride being in the range of from 1 mole to 3.5 moles of copper chloride for each mole of zinc chloride and the range of calcium chloride being between 0.5 mole to 2.5 moles of calcium chloride per mole of zinc chloride, whereby to produce perchloroethylene and trichloroethylene.

2. A catalyst composition comprising a carrier particle impregnated with copper chloride, zinc chloride and calcium chloride, said chlorides being present in amounts of from 5 percent to 45 percent by weight of the impregnated carrier, the ratio of copper chloride to zinc chloride being 1 mole to 3.5 moles of copper chloride per mole of zinc chloride, and the ratio of calcium chloride to zinc chloride being 0.5 mole to 2.5 moles of calcium chloride per mole of zinc chloride.

3. A composition suitable for catalytically promoting the production of perchloroethylene and trichloroethylene from symmetrical tetrachloroethane and oxygen comprising a carrier particle impregnated with copper chloride, zinc chloride, and calcium chloride, said chlorides being present in amounts of from 5 percent to 45 percent by weight of the impregnated carrier, the ratio of copper chloride to zinc chloride being 1 mole to 3.5 moles of copper chloride per mole of zinc chloride, the ratio of calcium to zinc chloride being 0.5 mole to 2.5 moles of calcium chloride per mole of zinc chloride.

4. A process for the production of perchloroethylene and trichloroethylene comprising reacting symmetrical tetrachloroethane and oxygen at elevated temperature in the presence of a catalyst comprising copper chloride, zinc chloride and calcium chloride supported on an inert carrier, said chlorides representing between 5 and 45 percent by weight of the catalyst, the ratio of copper chloride to zinc chloride being 1 mol to 3.5 moles of copper chloride per mole of zinc chloride, the ratio of calcium chloride to zinc chloride being 0.5 mole to 2.5 moles of calcium chloride per mole of zinc chloride, whereby to produce perchloroethylene and trichloroethylene.

5. A catalyst composition comprising a carrier particle impregnated with copper chloride, zinc chloride and calcium chloride, the ratio of copper chloride to zinc chloride being 1 mole to 3.5 moles of copper chloride per mole of zinc chloride, and the ratio of calcium chloride to zinc chloride being 0.5 mole to 2.5 moles of calcium chloride per mole of zinc chloride.

References Cited in the file of this patent
UNITED STATES PATENTS

| 1,985,343 | Connolly et al. | Dec. 25, 1934 |
| 2,342,100 | Cass | Feb. 22, 1944 |

UNITED STATES PATENT OFFICE
CERTIFICATE OF CORRECTION

Patent No. 2,914,576

November 24, 1959

Raymond M. Vancamp et al.

It is hereby certified that error appears in the printed specification of the above numbered patent requiring correction and that the said Letters Patent should read as corrected below.

Column 6, line 22, for "calcium" read -- calcium chloride --; line 31, for "mol" read -- mole --.

Signed and sealed this 27th day of September 1960.

(SEAL)
Attest:

KARL H. AXLINE
Attesting Officer

ROBERT C. WATSON
Commissioner of Patents